No. 815,711. PATENTED MAR. 20, 1906.
W. A. JOHNSON.
PEA HARVESTING MACHINE.
APPLICATION FILED AUG. 24, 1905.

3 SHEETS—SHEET 1.

Witnesses:

Inventor

No. 815,711. PATENTED MAR. 20, 1906.
W. A. JOHNSON.
PEA HARVESTING MACHINE.
APPLICATION FILED AUG. 24, 1905.

2 SHEETS—SHEET 2.

Witnesses:

Inventor,

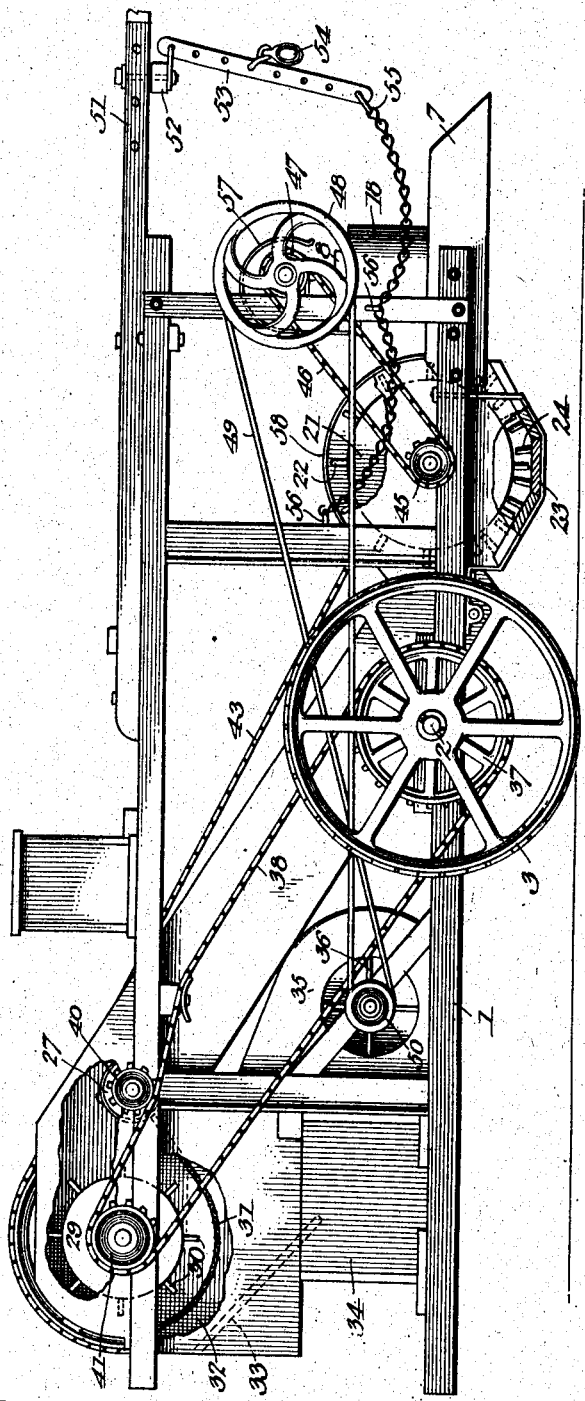

UNITED STATES PATENT OFFICE.

WILLIAM ALEXANDER JOHNSON, OF MOUNT VERNON, GEORGIA.

PEA-HARVESTING MACHINE.

No. 815,711. Specification of Letters Patent. Patented March 20, 1906.

Application filed August 24, 1905. Serial No. 275,622.

*To all whom it may concern:*

Be it known that I, WILLIAM ALEXANDER JOHNSON, a citizen of the United States, residing at Mount Vernon, in the county of Montgomery and State of Georgia, have invented certain new and useful Improvements in Pea-Harvesting Machines; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to a machine for harvesting dry peas; and it has for its object to provide a machine which will cut the vines, feed them to a threshing-cylinder, from which the peas and vines will be delivered to an endless carrier, which will deliver them to a beating-cylinder, by which the peas will be subjected to an action which will separate them from the pods and vines and discharge the pods and vines from the machine, while the peas will pass through a screen and be discharged into a receiving chamber or drawer and subjected in their passage from the screen to the chamber to an air-blast which will separate from the peas and carry off broken particles of the vines or pods and other foreign matter which may pass from the screen with the peas.

To the accomplishment of the foregoing and such other objects as may hereinafter appear, the invention consists in features of construction and in combination of parts, which will be hereinafter particularly described and then sought to be clearly defined by the claims, reference being had to the accompanying drawings, forming a part hereof, and in which—

Figure 1:
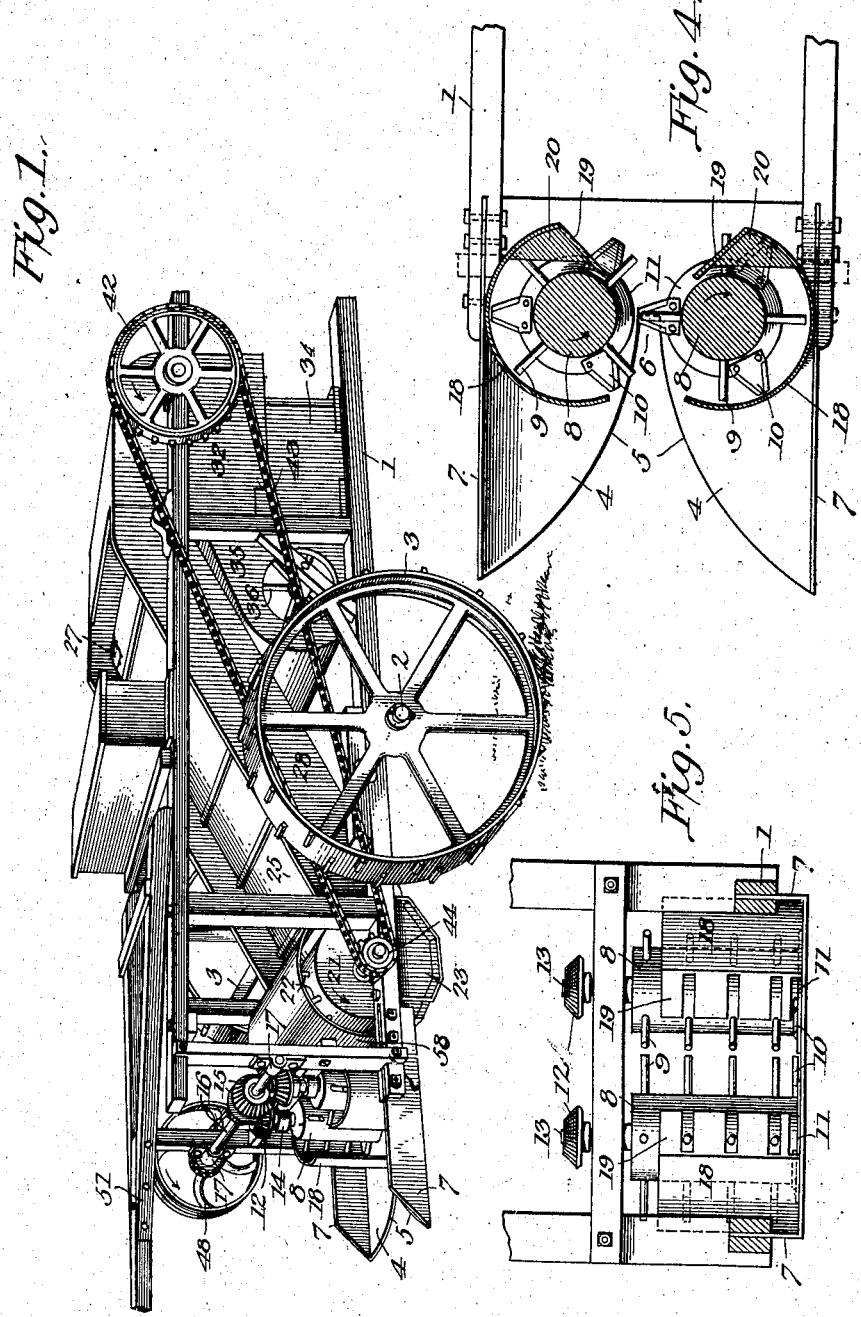
Figure 2:
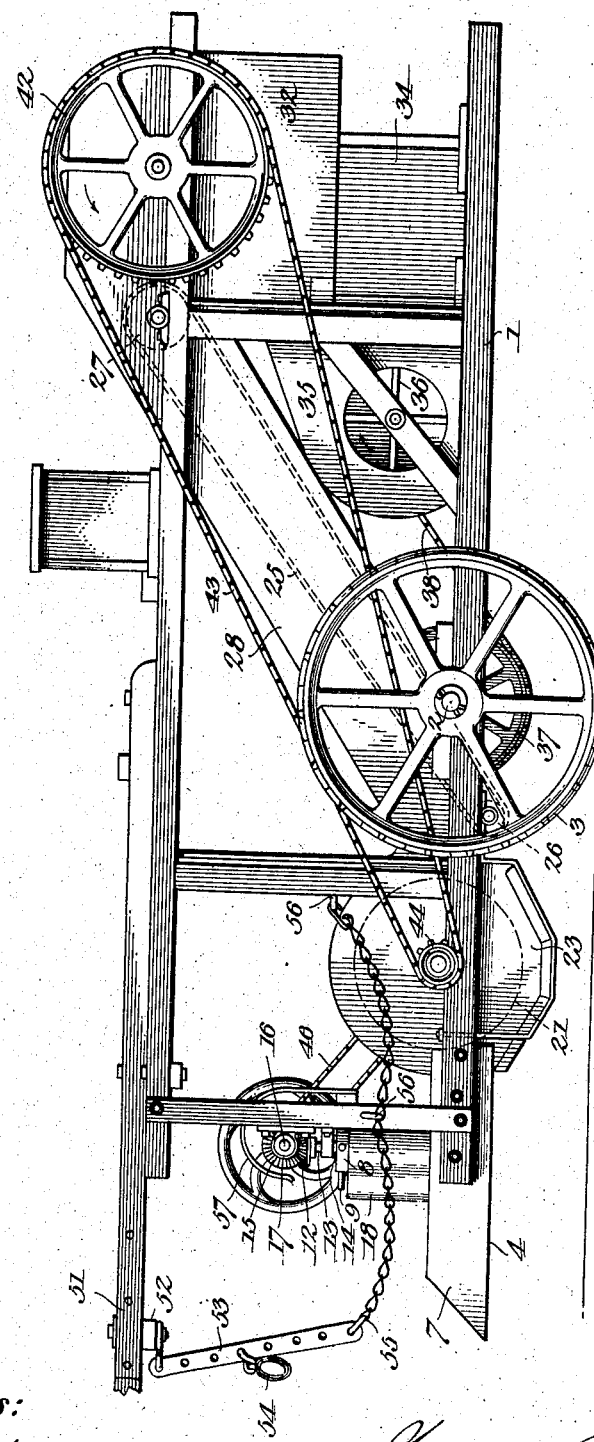

Figure 1 is a perspective of the machine. Fig. 2 is a side elevation. Fig. 3 is a side elevation from the opposite side with portions broken away. Fig. 4 is a horizontal section through the upright feed-rolls and their shields, and Fig. 5 is a detail elevation of the feed-rolls and their strippers looking from the rear with portions of the frame broken away and portions in section.

In the drawings, the numeral 1 designates a suitable frame mounted upon an axle 2, supported from the drive-wheels 3. At the front of the machine there is supported a gatherer, made, preferably, of sheet-steel, although it may be made of other material, and consisting of horizontally-disposed members 4, formed with converging faces or edges 5 and with a throat 6, closed at its rear end to prevent the unobstructed passage of uncut vines from the rear of the throat and having upright sides 7, designed to embrace the standing vines and to draw them into the throat 6 as the harvester is drawn by horses along the rows of vines. At the front of the harvester, adjacent to the throat 6 of the gatherer, is located two upright feed-rolls 8, each being provided with a number of teeth 9 and carrying at their lower ends cutting blades or knives 10, which preferably are of the mower-knife type and which are attached to disks 11, suitably secured to the bottom of the rolls 8, so as to project beyond the periphery of the rolls, as illustrated, said knives lying close or adjacent to the plane of the members 4 and so as to sweep across the throat 6 of the gatherer in the rotation of the feed-rolls, whereby as the teeth of the rolls draw the vines between the rolls the cutting blades will sweep across the throat 6 and sever the vines from the portions thereof in the ground. These rolls are rotated by means of miter-gears 12, connected to shafts 13 of the rolls, which are journaled in suitable boxes 14, attached to a cross-timber of the frame and with which gears mesh miter-gears 15 upon a counter-shaft 16, journaled in boxes 17 and rotated as hereinafter described. To one side and in front of the feed-rolls 8 are located shields 18, which aid in guiding the vines to the space between the feed-rolls, where they are grasped by the teeth of the rolls and carried between the rolls. The rear portions of these shields back of the feed-rolls are deflected inwardly toward and quite near to the feed-rolls and are slotted transversely, so as to permit the passage of the cutting-knives and teeth carried by the feed-rolls, the slots corresponding in number to the rows of teeth around the feed-rolls.

The deflected portions of the shields 18 are indicated by the numerals 19, and these deflected portions constitute strippers which strip the vines from the feed-rolls and permit them to be caught by the threshing cylinder or roll. For the purpose of stiffening these deflected portions of the shields there is placed in the angle formed at the deflected portion blocks 20, preferably of wood, which have slots corresponding to the slots in the strippers, so that the cutting-blades and teeth of the feed-rolls may pass through the same.

To the rear of the feed-rolls a cylinder or roll 21 is journaled in suitable boxes on side timbers of the frame, which roll is provided with a number of teeth or fingers 22, and beneath this threshing cylinder or roll is a concave 23, which is provided with rows of teeth 24, which act, in conjunction with the teeth of the roll, to thresh the peas fed thereto by the feed-rolls. From the threshing roll or cylinder there extends upwardly and rearwardly an endless-belt carrier 25, which travels around lower and upper rolls 26 and 27, said carrier operating within a trough 28. At the upper end of the trough 28, to the rear of the upper end of the endless carrier, is journaled a beater-cylinder 29, which is provided with a number of fingers or teeth 30, and beneath this cylinder is a concave screen 31, preferably made of wire, which screen is suitably supported within a box or chamber 32, in which is an inclined board 33 for directing the peas which pass through the screen down into a removable drawer or trough 34. Beneath the trough 28, at the front of the box or chamber 32, is a casing 35, containing a suitable fan 36, by which an air-blast is directed into the box or chamber 32, so as to carry off broken particles of the vines and hulls and other matter that may pass through the screen with the peas, and thus cause the peas to be delivered to the receiving drawer or trough free from such foreign substances.

To one of the drive-wheels 3 is attached a sprocket-wheel 37, from which extends a sprocket-chain 38, which passes beneath and engages with a toothed wheel 40 on the shaft of the upper roll 27 of the belt-carrier and which also passes around a sprocket-wheel 41 on the shaft of the beater-cylinder 29, thus transmitting motion from the drive-wheel to the endless carrier and the beater-cylinder and actuating said parts. The other end of the shaft of the beater-cylinder carries a sprocket-wheel 42, from which a sprocket-chain 43 passes to and around a sprocket-wheel 44 on one end of the shaft of the threshing-cylinder 31, thus transmitting rotary motion to that cylinder or roll. On the opposite end of the shaft of this threshing roll or cylinder is a sprocket-wheel 45, from which passes a sprocket-chain 46 to and around a sprocket-wheel 47 on the shaft 16, which carries the miter-gears 15, thus transmitting motion to said gears and through them and the miter-gears 12 to the upright toothed feed-rolls 8 at the front of the machine. On the end of the shaft 16 is a belt-wheel 48, from which a belt 49 passes to a pulley 50 on the shaft of the fan 36, thus transmitting power to the fan.

From the front of the machine extends a tongue 51, from which is supported an evener 52, from which suspend bars 53, to which swingletrees 54 are connected and to which are also connected chains 55, which are attached by hooks 56 or otherwise to upright side timbers of the frame, thus causing the draft to be from the tongue and also from opposite sides of the harvester-frame.

A shield 57, of sheet metal or other material, is employed to cover the miter-wheels 12 and 15, and a shield 58, of sheet metal or other material, is provided to cover the threshing cylinder or roll 21.

In operation as the harvester is drawn by horses along the row of peas the vines are gathered in by the gatherer at the front of the machine and directed by the same into the throat 6, where the vines are grasped by the teeth on the feed-rolls and severed by the cutting-knives from the portion of the vines remaining in the ground, the closed rear end of the throat serving to check the backward movement of the vines and, as it were, hold the vines while the cutters sever them from the portions remaining in the ground. The severed vines are fed backward by the feed-rolls and stripped from the rolls by the strippers, whereupon they are caught by the threshing cylinder or roll and carried by its teeth between that roll and its concave, the teeth of the roll and of the concave serving to thresh the peas from the vines. The vines and pods, with their peas, are then elevated by the endless carrier and discharged from the upper end of the same into engagement with the beater-cylinder, by which the vines, together with the pods and peas, are thoroughly beaten, so as to loosen up the vines and permit the peas to drop onto the concave screen, the vines and pods being ejected from that end of the machine by the beater-cylinder. The peas pass through the screen and as they fall onto the directing-board 33 they are subjected to a strong air-blast from the fan, which blast carries off the light particles of the broken vines and pods and other foreign substances passing through the screen, while the peas freed therefrom pass into the receiving drawer or trough, from which they are removed as occasion requires.

By constructing the gatherer as described and arranging the two upright toothed feed-rolls in relation thereto and to each other, as specified, and providing said rolls with the cutting-knives placed to operate closely to the horizontal portion of the gatherer and to sweep across the throat 6, as mentioned, the pea-vines are fed evenly and regularly and without choking the throat, and the knives are caused to sever the vines at both sides of the throat and at the point where they will be continuously fed backward from opposite sides of the throat to the stripping-fingers at the rear, which clear the vines from the feed-roll teeth and cutting-knives, so that they may be caught by the threshing-cylinder and after being threshed be delivered to the carrier, which discharges them onto the beater-cylinder, as described, thus enabling the several operations to be carried on continuously, each part acting in conjunction with the adjacent part to effect the operation sought.

I have illustrated and described with particularity the preferred details of construction and arrangement of the several parts; but it is obvious that changes can be made therein which will be embraced within the scope of the appended claims.

Having described my invention and set forth its merits, what I claim is—

1. In a pea-harvesting machine, a gatherer having converging walls and a throat at the rear thereof, said throat being closed at its rear end, and a pair of upright feed-rolls located at opposite sides of said throat, the rolls being provided with teeth and having cutting-knives at their lower ends arranged to sweep across the throat from opposite sides thereof, the knives of one roll alternating with the knives of the other roll, substantially as described.

2. In a pea-harvesting machine, a gatherer having converging walls and a throat at the rear thereof, said throat being closed at its rear end, a pair of upright feed-rolls located at opposite sides of said throat and provided with teeth projecting therefrom, and disks secured to the lower ends of said rolls and provided with cutting-knives arranged to sweep across the throat from opposite sides thereof, the knives of one roll alternating with the knives of the other roll, substantially as described.

3. In a pea-harvesting machine, the gatherer having converging walls and a throat at the rear thereof, said throat being closed at its rear end, a pair of upright feed-rolls located at opposite sides of said throat and provided with teeth projecting therefrom and having flanges at their lower ends extending beyond the circumference thereof, and cutting-knives secured to said flanges and arranged to sweep across the throat from opposite sides thereof, the knives of one roll alternating with the knives of the other roll, substantially as described.

4. In a pea-harvesting machine, a gatherer having converging walls and a throat at the rear thereof, said throat being closed at its rear end, a pair of upright feed-rolls located at opposite sides of said throat and provided with teeth projecting therefrom and having at their lower ends cutting-knives arranged to sweep across the throat from opposite sides thereof, the knives of one roll alternating with the knives of the other roll, and strippers located at the rear of said feed-rolls and arranged to strip the vines from the teeth and knives of the feed-rolls, substantially as described.

5. In a pea-harvesting machine, a gatherer having converging walls and a throat at the rear thereof, a pair of upright feed-rolls located at opposite sides of said throat and provided with teeth projecting therefrom and having at their lower ends cutting-knives arranged to sweep across the throat on opposite sides thereof, and shields located about said feed-rolls and having their rear portion deflected inwardly toward the rolls at the rear thereof, said deflected portions being formed with slots for the passage of the teeth of the feed-rolls and serving as strippers therefor, substantially as described.

6. In a pea-harvesting machine, the gatherer having converging walls and a throat at the rear thereof, a pair of upright feed-rolls located at opposite sides of said throat and provided with teeth projecting therefrom and having at their lower ends cutting-knives arranged to sweep across the throat from opposite sides thereof, the knives of one roll alternating with the knives of the other roll, miter-gears connected with the upper ends of said feed-rolls, and a counter-shaft having miter-gears meshing with the miter-gears of the feed-rolls for rotating said rolls, substantially as described.

7. In a pea-harvesting machine, a gatherer having converging walls and a throat at the rear thereof, a pair of upright feed-rolls located at opposite sides of said throat and provided with teeth projecting therefrom and cutting-knives arranged to sweep across the throat from opposite sides thereof, a toothed threshing-cylinder located to the rear of and in proximity to said feed-rolls, and a stripper located between said threshing-cylinder and feed-rolls to strip vines from the teeth of the feed-rolls and direct them into position to be caught by the teeth of the threshing-cylinder, substantially as described.

8. In a pea-harvesting machine, a gatherer having converging walls and a throat at the rear thereof, a pair of upright feed-rolls located at opposite sides of said throat and provided with teeth projecting therefrom and cutting-knives arranged to sweep across the throat from opposite sides thereof, a toothed threshing-cylinder located to the rear of and in proximity to the feed-rolls to have its teeth engage with vines fed thereto by the feed-rolls, a beater-cylinder, a carrier for transferring vines from the threshing-cylinder to the beater-cylinder, means for transmitting power from a drive-wheel of the machine to the beater-cylinder, means transmitting power from said cylinder to the threshing-cylinder, and means for transmitting power from the threshing-cylinder to the feed-roll, substantially as described.

9. In a pea-harvesting machine, a gatherer having converging walls and a throat at the rear thereof, a pair of upright feed-rolls located at opposite sides of said throat and provided with teeth projecting therefrom and cutting-knives arranged to sweep across the throat from opposite sides thereof, a toothed threshing-cylinder located to the rear of and in proximity to the feed-rolls to have its teeth grasp the vines fed thereto by the feed-rolls, a beater-cylinder, a carrier for transferring vines from the threshing-cylinder to the beater-cylinder, a box or chamber containing a concave screen located under the beater-cylinder, a fan having a discharge-mouth opening into said box or chamber beneath said screen, and a train of gearing for transmitting power from the drive-wheel of the machine to the carrier, beater-cylinder, threshing-cylinder, feed-rolls, and fan, substantially as described.

In testimony whereof I affix my signature in presence of two witnesses.

WILLIAM ALEXANDER JOHNSON.

Witnesses:
 JOHN JAY MACARTHUR,
 E. C. MCALLISTER.